(No Model.) 10 Sheets—Sheet 1.
N. W. PRATT.
STEAM GENERATOR.
No. 570,229. Patented Oct. 27, 1896.
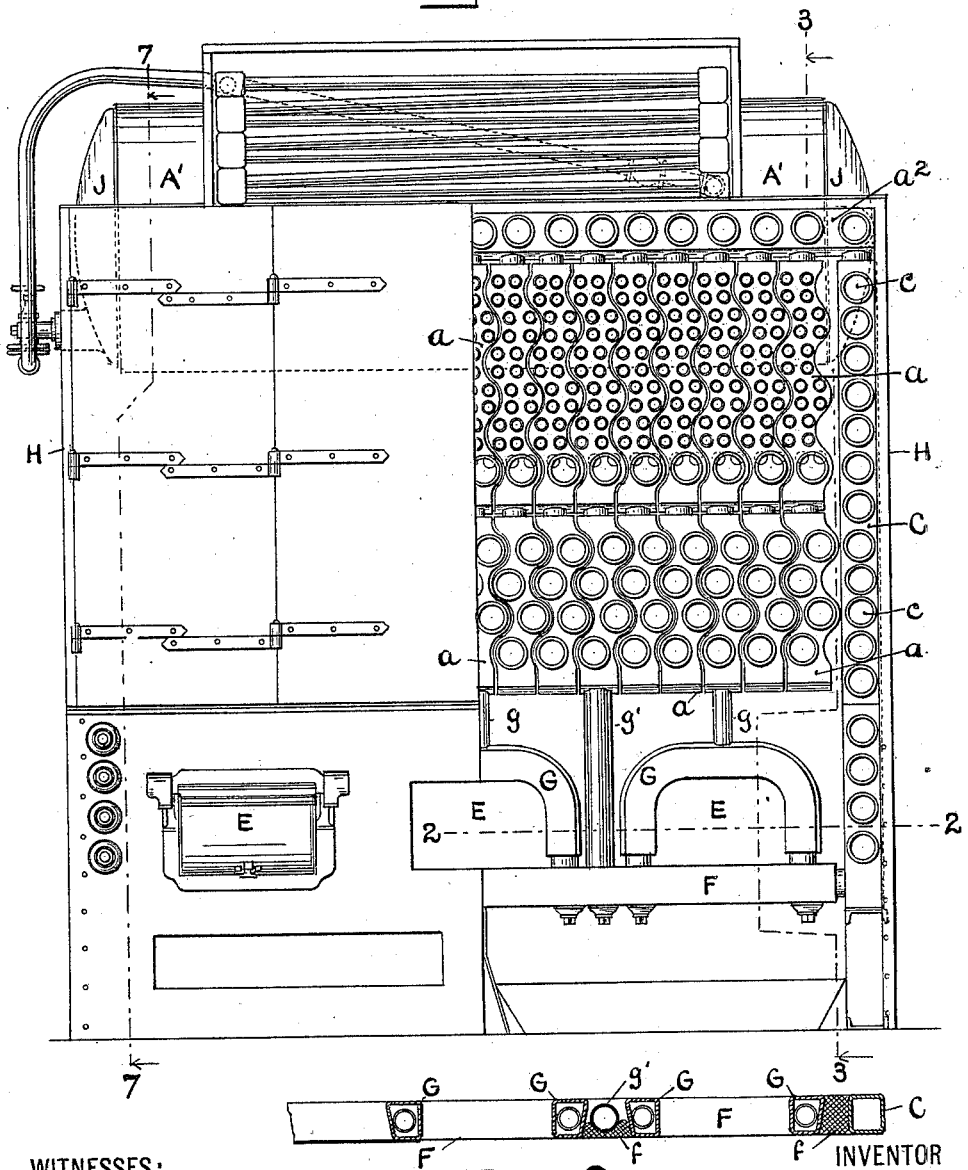
WITNESSES:
Chas. Hanimann
Edwin Salisbury Jones
INVENTOR
Nat W. Pratt
BY
Chas. N. Dorler
ATTORNEY (No Model.) 10 Sheets—Sheet 2.
N. W. PRATT.
STEAM GENERATOR.
No. 570,229. Patented Oct. 27, 1896.
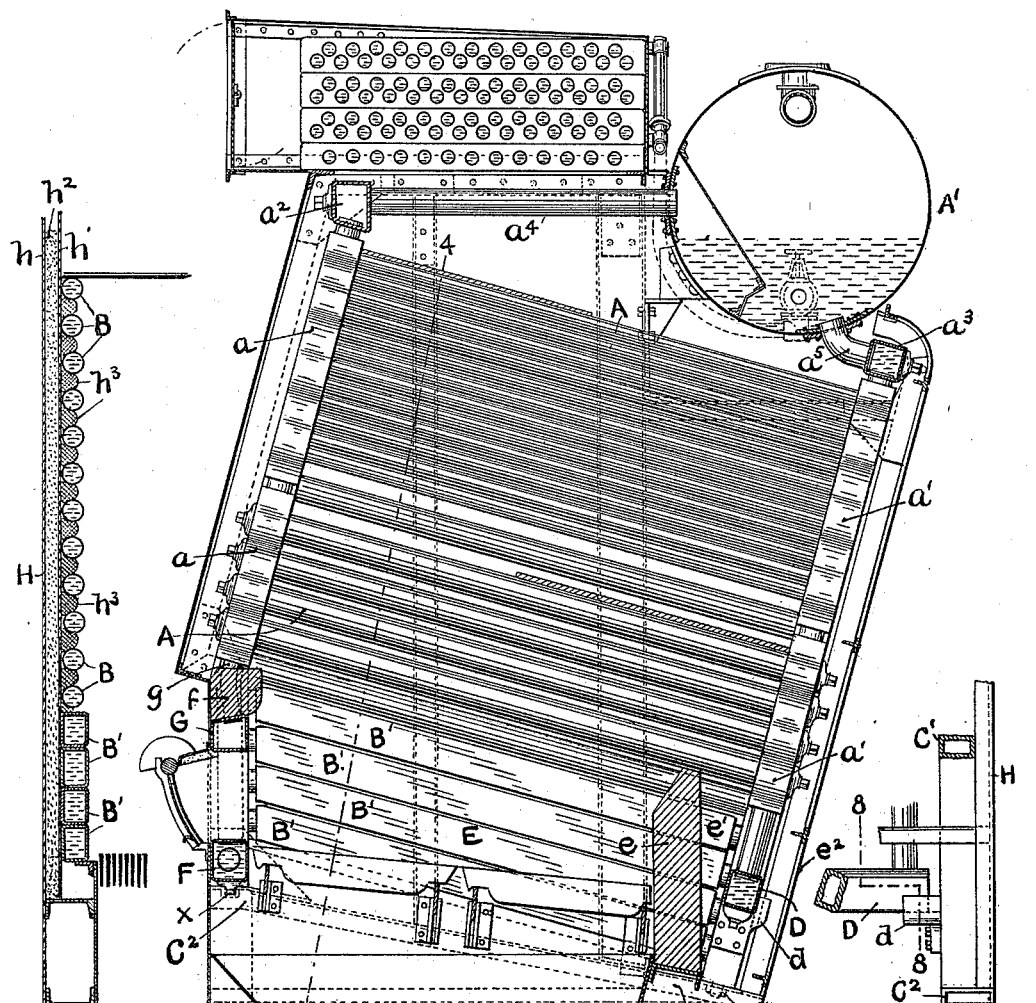
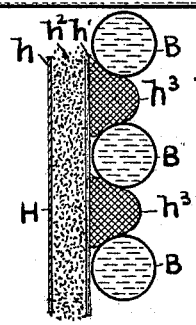
WITNESSES:
Chas. Hanimann
Edwin Salisbury Jones
INVENTOR
Nat. W. Pratt
BY
Chas. N. ——
ATTORNEY
THE NORRIS PETERS CO., PHOTO-LITHO., WASHINGTON, D. C.

(No Model.)
N. W. PRATT.
STEAM GENERATOR.
No. 570,229. Patented Oct. 27, 1896.
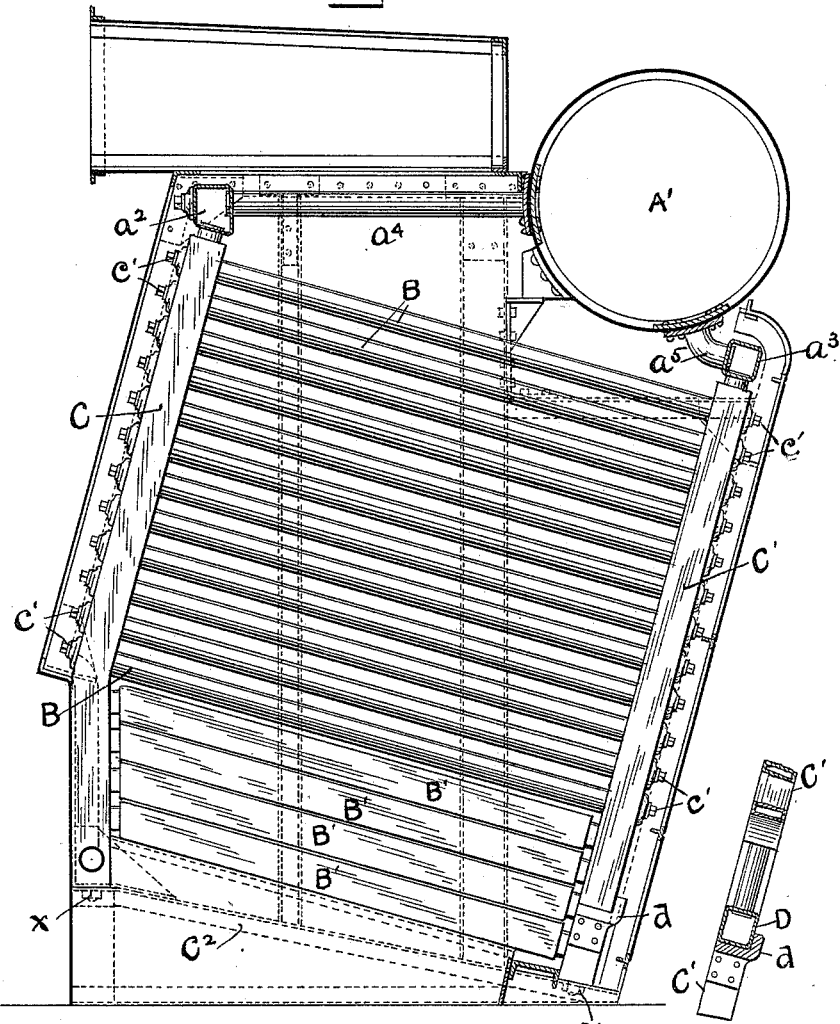
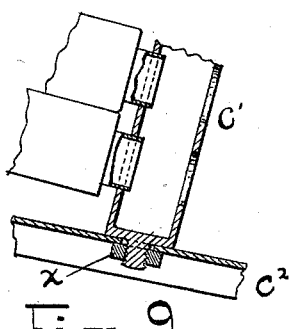
WITNESSES:
Chas. Hanimann
Edson Salisbury Jones
INVENTOR
Nat. W. Pratt
BY
Chas. W. dorbes
ATTORNEY (No Model.) 10 Sheets—Sheet 4.

N. W. PRATT.
STEAM GENERATOR.

No. 570,229. Patented Oct. 27, 1896.

WITNESSES:
Chas. Hanimann
Edson Salisbury Jones

INVENTOR
Nat W. Pratt
BY
Chas. W. dorber
ATTORNEY

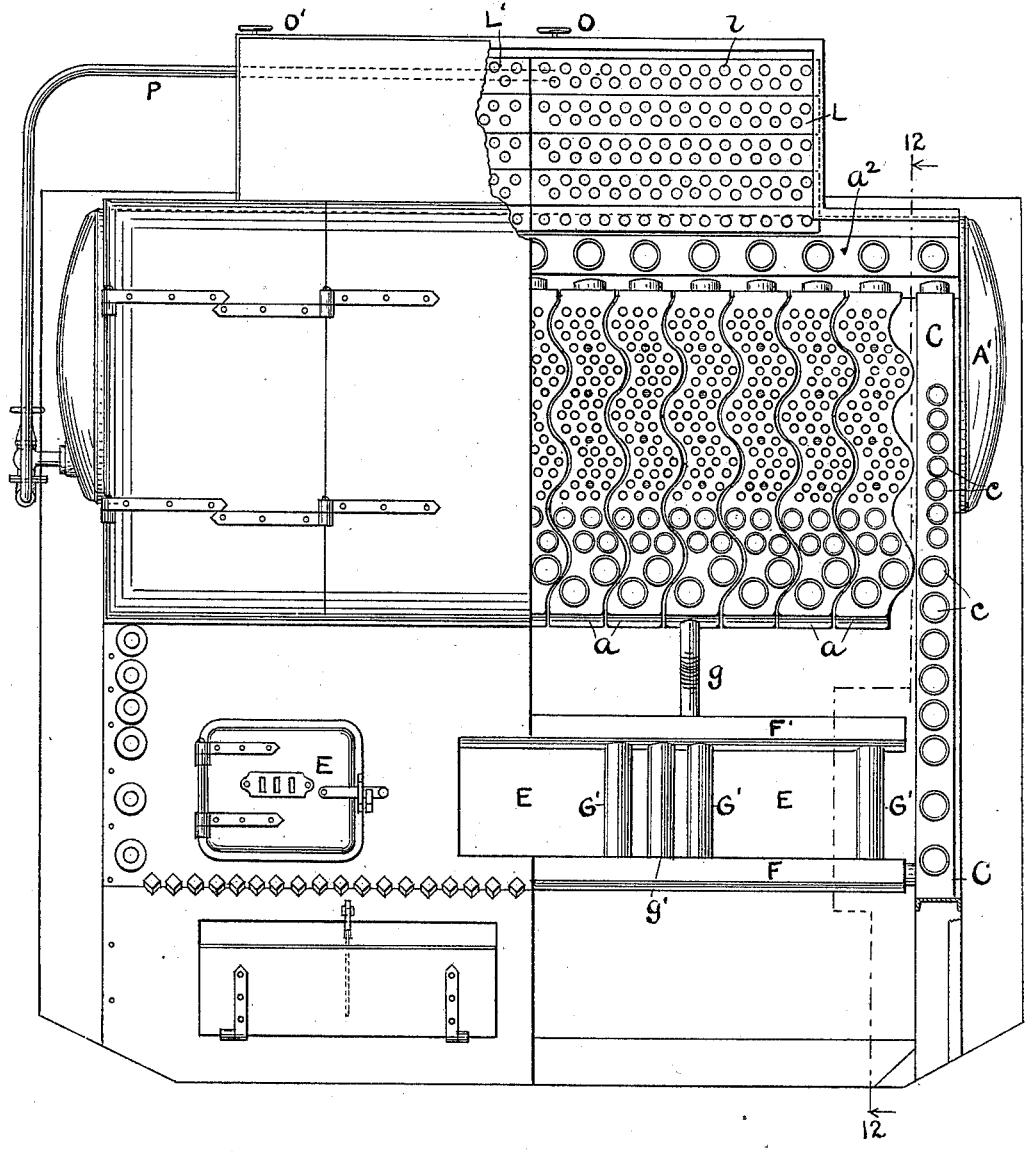

(No Model.) 10 Sheets—Sheet 6.
N. W. PRATT.
STEAM GENERATOR.
No. 570,229. Patented Oct. 27, 1896.
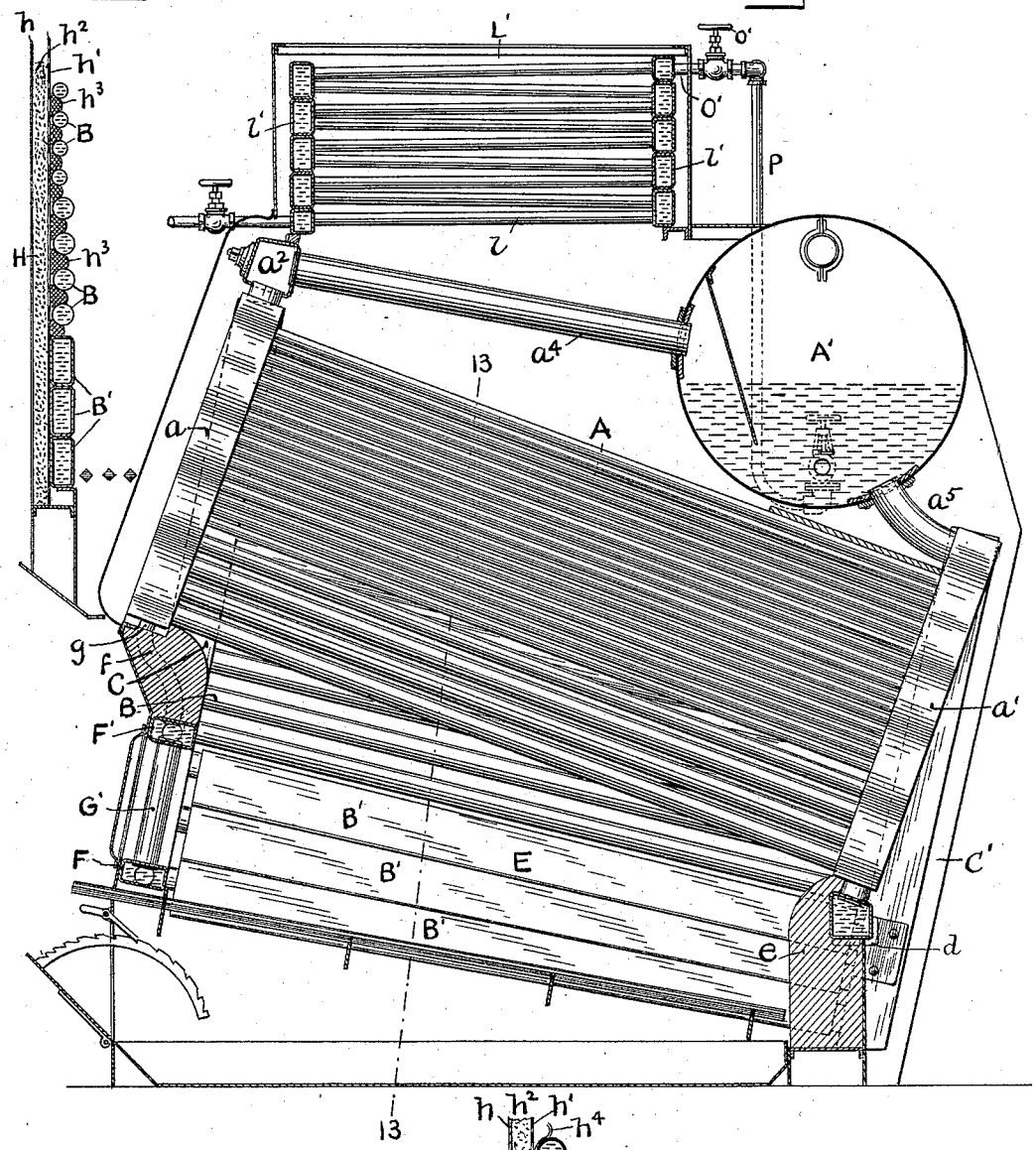
WITNESSES:
Chas. Hanimann
Edwin Salisbury Jones
INVENTOR
Nat W. Pratt
BY
Chas. N. Corker
ATTORNEY

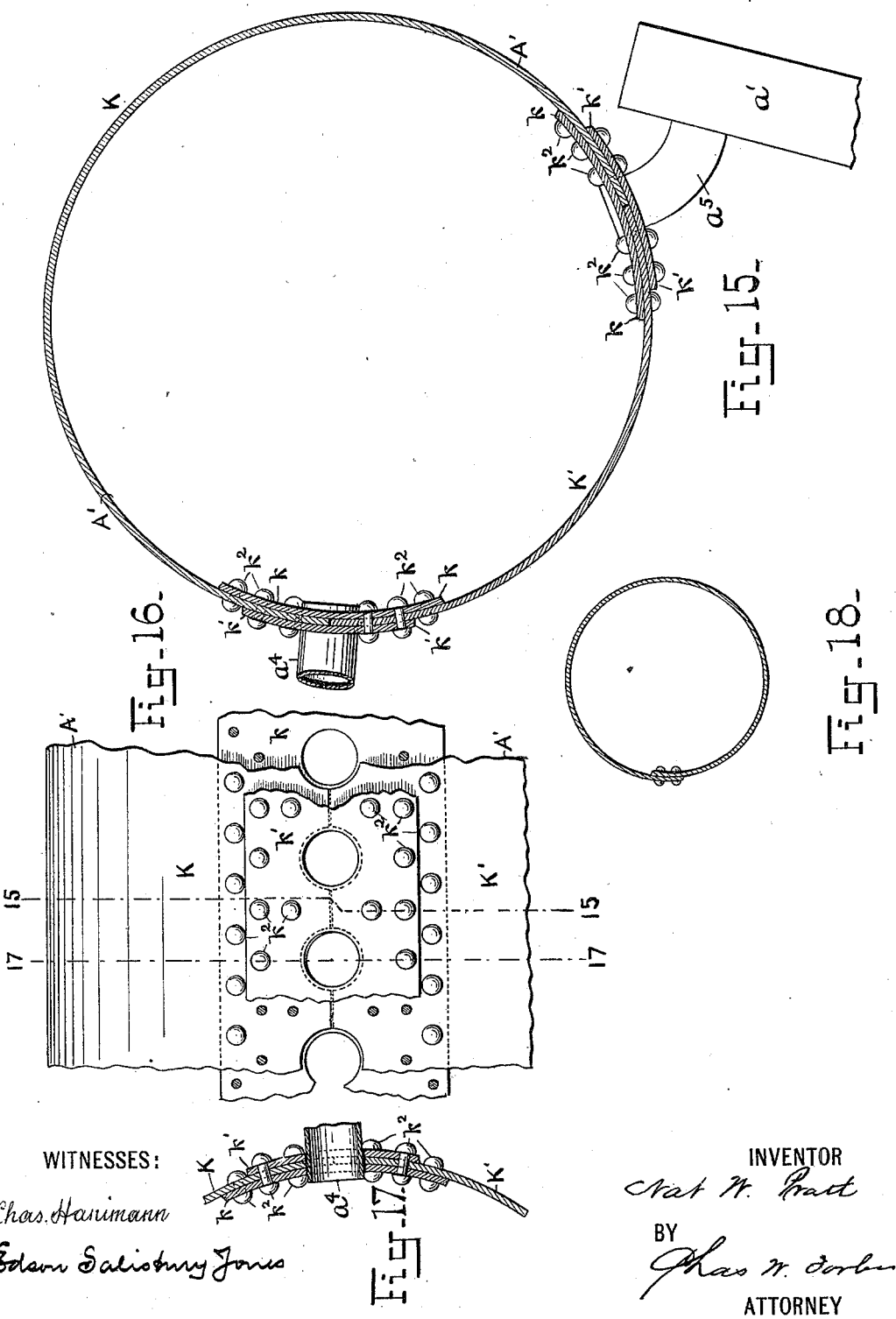

(No Model.)   10 Sheets—Sheet 8.

N. W. PRATT.
STEAM GENERATOR.

No. 570,229. Patented Oct. 27, 1896.

WITNESSES:
Chas. Hanimann
Edson Salisbury Jones

INVENTOR
Nat. W. Pratt
BY
Chas. N. Corben
ATTORNEY

No Model.)
10 Sheets—Sheet 9.

N. W. PRATT.
STEAM GENERATOR.

No. 570,229.
Patented Oct. 27, 1896.

WITNESSES:
Chas Hanimann
Eason Salisbury Jones.

INVENTOR
Nat. W. Pratt
BY
Chas W. Dorler
ATTORNEY

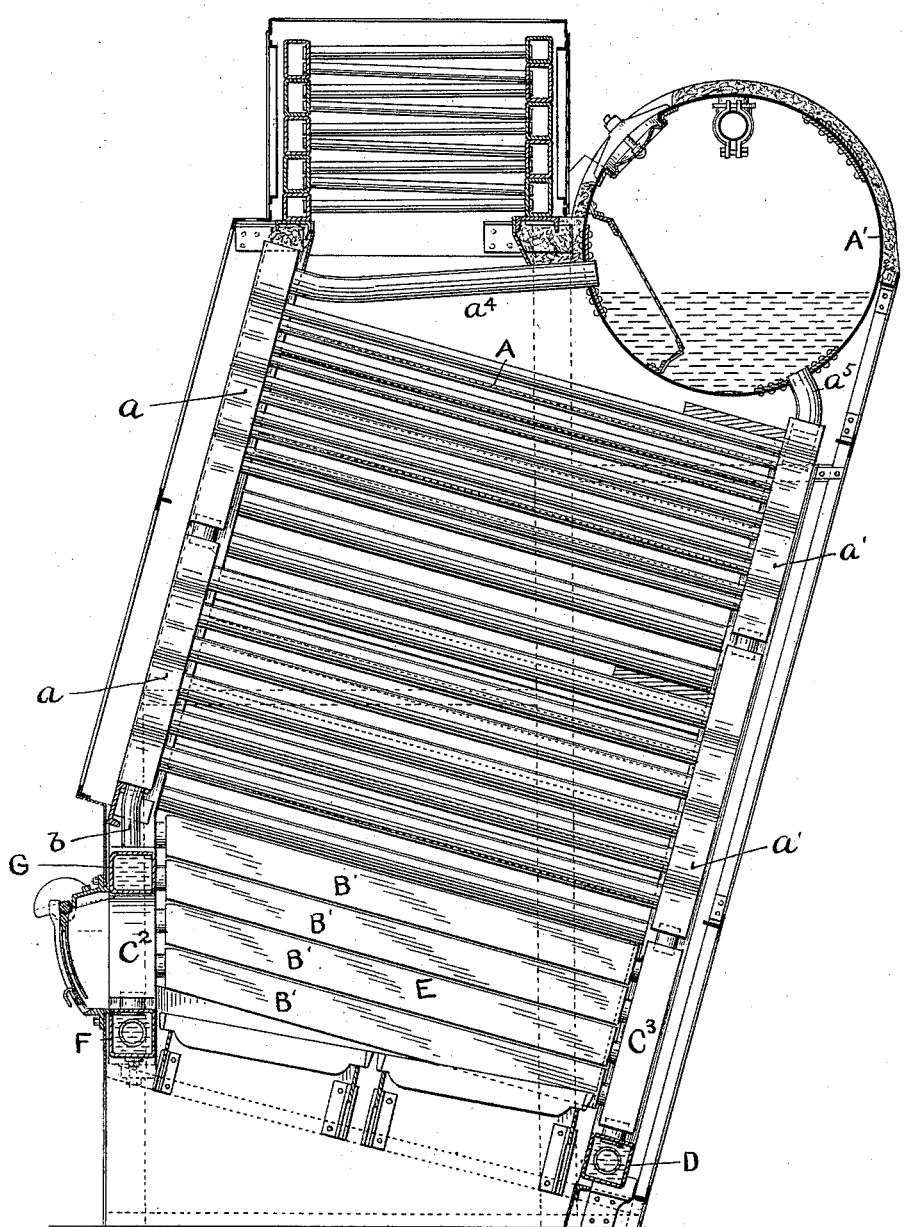

UNITED STATES PATENT OFFICE.

NAT W. PRATT, OF BROOKLYN, NEW YORK, ASSIGNOR TO THE BABCOCK & WILCOX COMPANY, OF NEW YORK, N. Y.

STEAM-GENERATOR.

SPECIFICATION forming part of Letters Patent No. 570,229, dated October 27, 1896.

Application filed April 8, 1896. Serial No. 586,664. (No model.)

*To all whom it may concern:*

Be it known that I, NAT W. PRATT, a citizen of the United States, residing in Brooklyn, in the county of Kings and State of New York, have invented certain new and useful Improvements in Steam-Generators, of which the following is a specification.

The improvements hereinafter described are particularly adapted to marine boilers, though they are applicable to boilers for land service as well.

The improvements consist in certain novel features of construction and arrangement, which will be described in the specification, and pointed out in the claims.

Figure 10:
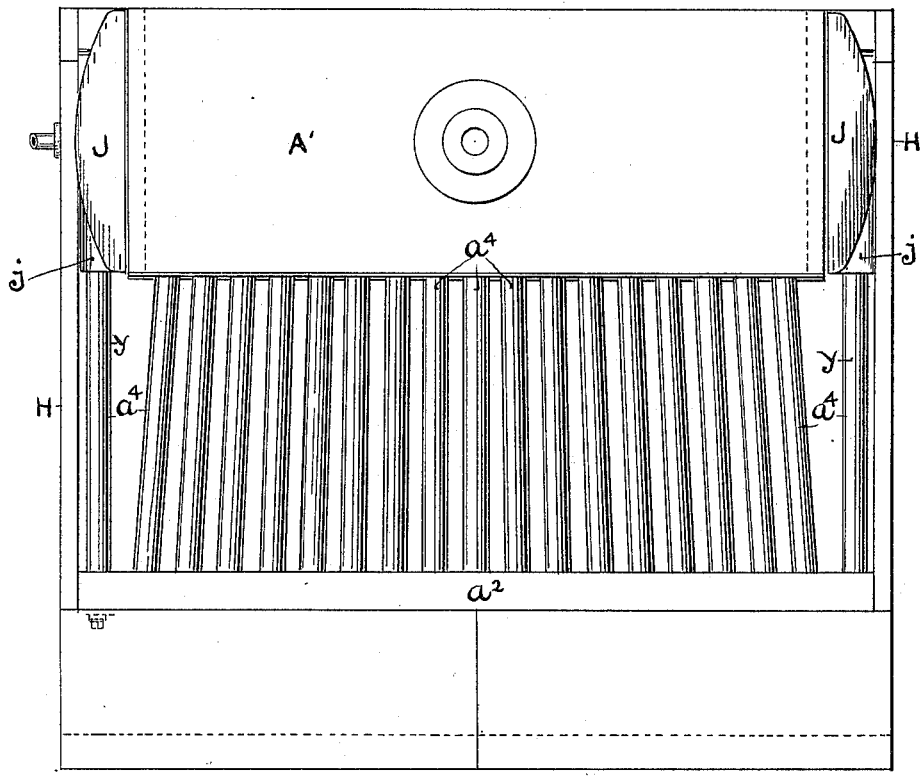
Figure 19:
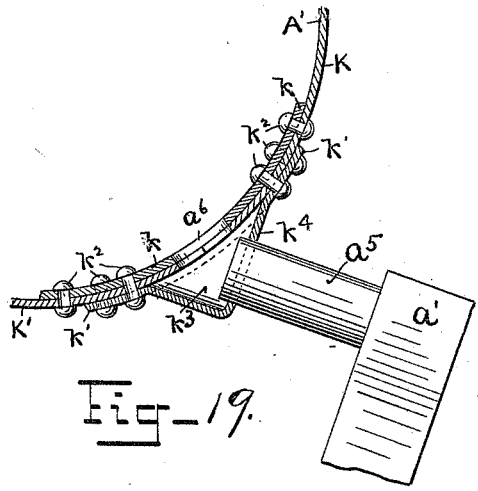
Figure 20:
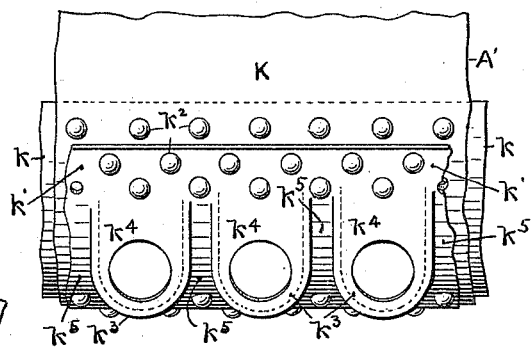
Figures 21, 22, 23:
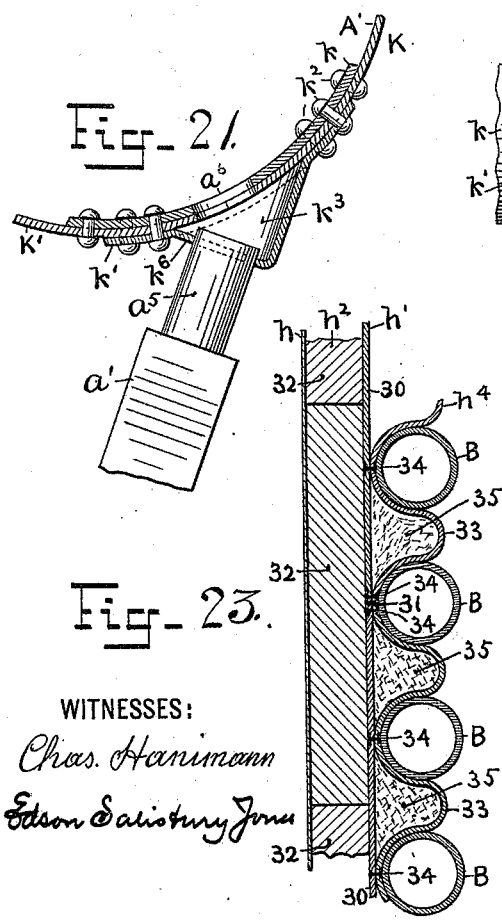
Figure 24:
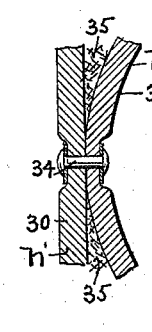
Figure 25:
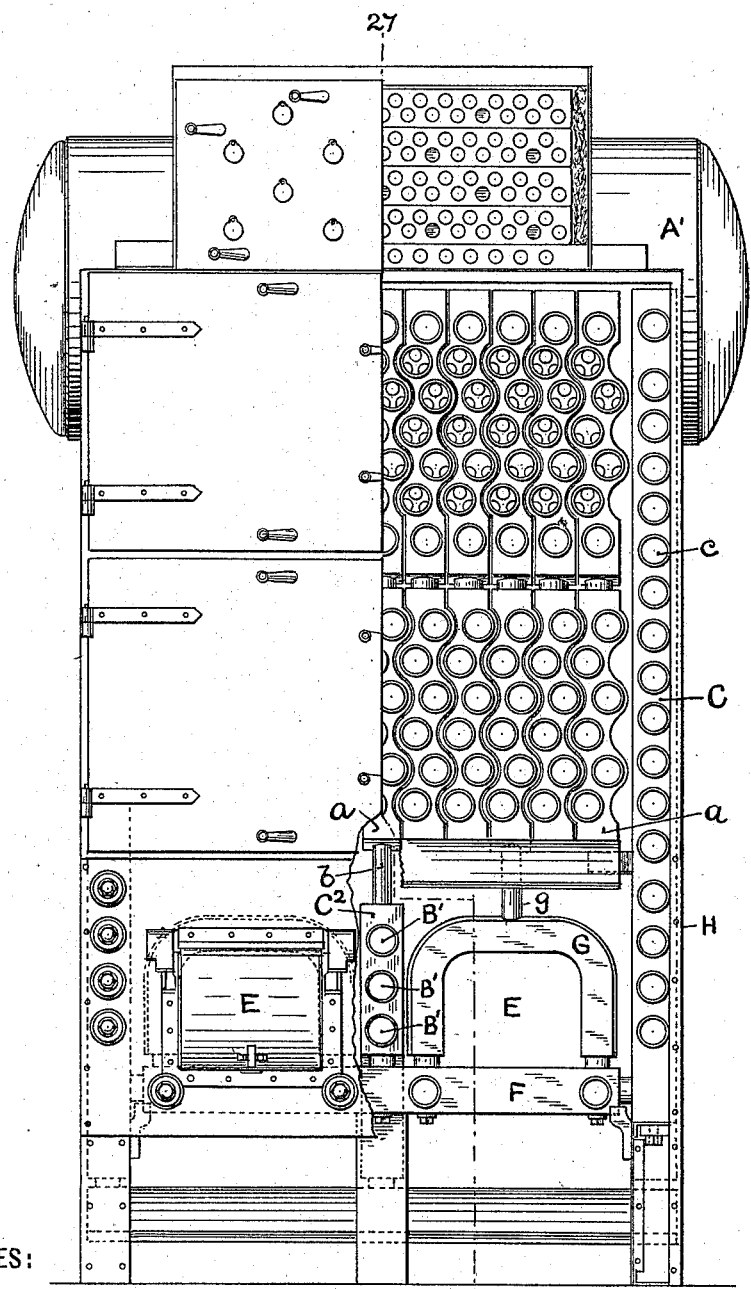

In the accompanying drawings, Figure 1 represents a front view of the boiler with a part of the casing and the hand-hole covers of the boiler-tubes removed, the ends of the steam-and-water drum being within the side casing of the boiler. Fig. 2 shows a horizontal section through a portion of the same on line 2 2 of Fig. 1. Fig. 3 represents a vertical section on line 3 3 of Fig. 1, showing a side view of the stacks of tubes and their headers, with certain parts in section. Fig. 4 shows a vertical transverse section of a portion of the siding of the boiler on line 4 4 of Fig. 3. Fig. 5 represents on a larger scale a vertical transverse section of a portion of such siding. Fig. 6 represents a rear view of the lower part of one of the corner-columns and a part of the mud-box or drum in its anchor-plate. Fig. 7 represents a vertical section on line 7 7 of Fig. 1, showing in elevation the side tubes of the boiler and the two corner-columns with which they are connected, the steam-and-water drum and upper boxes being in transverse section. Fig. 8 represents a vertical section on line 8 8 of Fig. 6. Fig. 9 shows a vertical section through a lower portion of one of the rear corner-columns on a larger scale. Fig. 10 represents a top view of the steam-and-water drum and its pipe connections with the box that surmounts the front headers, the ends of the drum being within the side casings of the boiler. Fig. 11 represents a front view of the boiler with certain variations in constructions, a part of the casing being removed. Fig. 12 shows a vertical section of the same on line 12 12 of Fig. 11. Fig. 13 represents a vertical section of a portion of the siding of this boiler on line 13 13 of Fig. 12. Fig. 14 represents on a larger scale a vertical transverse section of the lower portion of such siding, the nonconducting filling between the side tubes being differently constructed. Fig. 15 shows on an enlarged scale a transverse section of the steam-and-water drum on line 15 15 of Fig. 16, representing an improved form of construction. Fig. 16 represents a side view of a portion of the drum. Fig. 17 shows a transverse section of a part of the drum on line 17 17 of Fig. 16. Fig. 18 represents, on a smaller scale, a transverse section of a steam-and-water drum of a well-known construction. Fig. 19 represents in transverse section a portion of the steam-and-water drum and in side view a portion of a rear header of the boiler, the connection between the drum and the header being modified. Fig. 20 shows a rear view of a portion of such drum. Fig. 21 represents in transverse section a portion of the steam-and-water drum and in side view a portion of a rear header, the connections between the drum and headers being upright ones. Fig. 22 shows a rear view of such portion of the drum, headers, and connections. Fig. 23 represents, on an enlarged scale, a vertical transverse section of the siding and the side tubes of the boiler, the siding being of improved construction. Fig. 24 shows, on a still larger scale, a vertical transverse section through a part of the inner sheeting of the siding and the serpentine filling-board riveted thereto. Fig. 25 represents a front view of a boiler with a part of the casing and the hand-hole covers of the boiler-tubes removed, in which two furnaces are shown, both sides of each of which are composed of water-tubes. Fig. 26 shows a vertical longitudinal section of such boiler on line 27 27 of Fig. 25.

The boiler shown in the drawings is of that class known as a "sectional" boiler, which is composed of a stack or stacks of steam-generating tubes A, Fig. 3, slightly inclined upwardly from rear to front, and their respective ends connected to headers $a\ a'$, that are connected to the steam-and-water drum A'. The boiler shown is also of the marine type, with which no exterior masonry setting is employed, but the sides are composed of water conduits or tubes in circulatory connection with the drum, which conduits or tubes furnish additional steam-making capacity.

One feature of the invention relates to the means employed in securing a circulation through these side conduits or tubes, which construction also enables the boiler to be hung up or suspended and provides for the longitudinal expansion of the tubes.

In Fig. 7 of the drawings the conduits upon one side of the boiler are shown, the same being adapted to the boiler shown in Fig. 3 and being in the form of tubes B B', which are connected at their ends to upright hollow water-columns C C', the series of tubes on the other side being similarly connected, so that four corner-columns are employed, two (C C) at the front and two (C' C') at the rear. On the front and rear faces the columns are respectively provided with holes $c$ in alinement with the tubes, which are normally closed by hand-hole covers $c'$.

Extending transversely of the boiler, on the front, is a box $a^2$, and a similar box $a^3$ extends transversely of the same at the rear, the said boxes being nippled or connected near their ends to the upright columns C C C' C', respectively, which columns the ends of the boxes overlie. The box $a^2$ is connected with the drum A' by pipes $a^4$, and the box $a^3$ is connected with the drum by pipes $a^5$, so that the circulation of water from the drum into the tubes B B' is down through the pipes $a^5$ into the box $a^3$, thence into the rear columns C' C' and into the tubes, while the steam from the tubes passes up through the front columns C C into the box $a^2$ and thence through the pipes $a^4$ into the drum.

The columns C C' are securely attached at their lower ends by bolts or otherwise, as shown at $x$, Figs. 3, 7, and 9, to a base iron or frame $C^2$, and, as shown in Figs. 1 and 3, the headers $a$ $a'$ are nippled or connected to the boxes $a^2$ $a^3$, respectively, so that the said columns and boxes support the headers and tubes, the same being suspended by the nipple connections to the boxes and columns, thereby providing for the longitudinal expansion of the tubes. Preferably a mud box or drum D is employed in connection with the boiler, and the rear lower end of the latter is anchored by irons, such as $d$, which fork the box and hold the rear end of the boiler in a fixed position, as shown in Figs. 3, 6, and 8, so that the expansion of the tubes thereof is wholly toward the front. If desired, however, the rear transverse box $a^3$ may be dispensed with, as shown in Fig. 12, and the pipes $a^5$ connect the rear headers directly with the drum A', such headers resting upon the rear wall $e$ of the furnace E, while the front of the boiler is suspended by the transverse box $a^2$ upon the front columns C C.

Another feature of the invention consists in making the lower side tubes B' in the form of boxes having flat smooth inner faces which form the sides of the furnace E and enable a fire-brick lining on such sides to be dispensed with. As shown in Fig. 4, these tubes are rectangular in cross-section and, as shown in Figs. 3 and 7, are placed one above the other in close proximity, and they are inclined upward from rear to front, so that no steam-pockets can be formed therein.

To furnish still greater facility for an outlet of steam formed therein, the boxes may be made larger at the front than at the rear ends or frusto-pyramidal in form, as shown in Fig. 12. Those faces of these boxes that are toward the fire are flat and smooth, so that they furnish no obstruction to a convenient use of fire-tools and no interstices or spaces for the lodgment of ashes, as they would were such boxes in the form of round pipes, in which case V-shaped crevices would be present, in which the tools would catch and refuse from the fire collect. These boxes have all the advantages of water-legs on the sides of the furnace, and, having no interior lateral stays between their sides to impede the circulation of water, they are superior to a water-leg made continuous or of two parallel cross-stayed sheets, not only because circulation is not disturbed, but because repairs to the sides of the furnace can be much more easily, quickly, and inexpensively made, owing to the sectional character of the improved furnace-siding.

In order further to increase the steam-making capacity of the boiler, provision is made at the front thereof, below the headers, for a circulation of water around the furnace-doorways. As shown in Fig. 1, a transverse box F is connected at its ends to the two front corner-columns C, and to it are nippled arch-shaped boxes G, which fork the doorways and are connected at their tops by one or more pipes $g$ to the front headers $a$. Between these arches also pipes $g'$ may extend from the box F to the headers above. In place, however, of employing these arch-shape boxes the construction may be such as shown in Fig. 11, where two transverse boxes F F' are used, which are connected by pipes G', extending between these boxes on each side of the doorways, the pipes $g'$ also connecting said boxes and the upper box being connected by pipes $g$ to the headers.

In the boilers represented in Figs. 1 and 11 the three furnaces E have the sidings, composed of the water-tubes B', arranged only on the outsides of the boiler, none being located between the furnaces. As shown in Figs. 26 and 27, however, a water-tube furnace-siding may be located between two adjacent furnaces, so that each furnace will be distinct from its neighbors and one furnace alone can be run with greater economy than in the arrangement shown in Figs. 1 and 11. With this construction the intermediate water-tubes B' have their ends connected so as to provide a circulation therethrough, as to short upright headers $C^2$ $C^3$, located at the front and rear of the boiler, respectively, the header $C^2$ being connected at its top, as by a pipe $b$, to one of the boiler-headers $a$, and at its lower end to the transverse box F, while the header $C^2$ is connected at its top to one of the rear headers $a'$ and at the bottom to the box D. If the box F' (shown in Fig. 11) be employed, however, the top of the header $C^2$ may be connected thereto instead of to a boiler-header, as will be readily understood.

The exterior siding H of the boiler is of improved construction, and is shown in Figs. 4, 5, and 13 as composed of an outer sheet $h$, of metal, an inner sheet $h'$, and an intermediate filling $h^2$, of non-heat-conducting material, such as asbestos boarding and magnesia filling, the siding being arranged in close proximity to the tubes B B', and properly secured in position. To increase the thickness of this siding and at the same time to fill the spaces between the pipes B, so that but little ashes or soot can lodge on the upper surfaces of said pipes, blocks or filling-pieces $h^3$, of asbestos or other suitable non-heat-conducting material, are located between said pipes. These blocks are preferably hard packed and are held in place by making their rear portions of greater width than their front portions, as clearly shown in Fig. 5. Substantially the same result may be secured, however, by forming asbestos board or similar material $h^4$ in serpentine shape between the sheet $h'$ and the pipes B, as shown in Fig. 14.

A preferred form of construction when such serpentine board is used is shown in Fig. 23, where the inner sheet $h'$ is made in pieces or sections (two, 30 30, of which are represented, being butt-jointed together at 31) and the intermediate filling $h^2$ is formed in block 32, the joints of which break with those of the inner sections 30. The serpentine inner lining $h^4$ is also shown as made in sections 33, which are secured to the sheet $h'$ by rivets 34. The spaces 35, between the sheet $h'$ and lining $h^4$, may be filled with blocks similar to those designated as $h^3$ in Fig. 5, or mineral wool or other non-heat-conducting material may be packed therein. In constructing this siding the sections 33 of the lining $h^4$ with the rivets therein are placed against the side tubes B, the packing in the spaces 35 is inserted, the sections 30 of the sheet $h'$ are applied and riveted to the sections 33, the blocks 32 composing the filling $h^2$ are put in place, and the outer metal sheet $h$ is secured in position.

The front of the boiler, between the box F and the lower ends of the headers $a$, is also preferably filled in with non-heat-conducting blocks $f$, of asbestos or other suitable material, as shown in Figs. 2, 3, and 12.

As ordinarily constructed the rear furnace-wall $e$ underlies the rear headers of the boiler and is beveled or rounded on its front upper corner, as shown in Fig. 12, so that ashes, &c., may not lodge thereon. It is sometimes the case, however, that with a definite length of boiler a shorter grate is desired, and if this wall retained the position described its thickness would have to be greatly increased and the bevel be so slight that the ashes, &c., would collect on its top and bank around the lower boiler-tubes, to their detriment. In Fig. 3 a construction is shown which avoids both of these features, the improvement consisting in setting the rear wall $e$ forward and at the end of the short grate, thereby leaving a space $e'$ behind the wall into which the ashes can fall and be removed through a door $e^2$ upon the rear casing of the boiler. The suspension of the boiler as hereinbefore described enables this to be done, as the rear wall in such case is not necessary as a support for the rear headers.

Another feature of the construction shown relates to the steam-and-water drum, whereby the same is enabled to be made a perfect circle in cross-section and is strengthened at the parts where it is perforated to receive the connecting-pipes.

Heretofore a drum has been constructed in which sheets have been used of a width equal to the circumference of the drum plus the width of the lapped sides of the sheets, as shown in Fig. 18, the said sheets being riveted together at their ends to produce the necessary length of drum, and the drum has been perforated at the lap to receive one set of pipes, the perforations for the other set of pipes being made through a single thickness of the sheets at the proper place. Such a drum is not only comparatively expensive, owing to the higher cost of such extra wide sheets, which are difficult to obtain, but it is somewhat imperfect because it is not truly circular in cross-section, the steam tending to force it into such true form, thereby producing an undue strain thereon.

The improved construction of drum is shown in Figs. 15, 16, and 17. In its manufacture two sheets are employed to make up its circumference, one of them, K, being of a width to make the upper portion of the circumference, and the other, K', of a width to make the lower portion thereof, the butt-joint edges of the sheets coming together in lines passing substantially through the centers of the pipes $a^4$ and $a^5$, respectively. These sheets are formed so that they make a true circle when placed together and, being of widths which are easily and commonly manufactured, are comparatively inexpensive. They are secured to each other by straps $k$ $k'$ and rivets $k^2$, the straps preferably being applied both interiorly and exteriorly, and the sheets are riveted together end to end to form the length of the drum. As the perforations to receive the pipes $a^4$ $a^5$ are made at the butt-joints of the sheets and through the straps $k$ $k'$ the drum is perforated at its strongest parts, thereby securing the greatest strength possible. This construction, however, is not claimed herein, as it is intended to make a separate application therefor.

In Figs. 3, 7, 12, and 15 the rear portion of the boiler is shown as connected to the drum by pipes $a^5$, which are curved, and are therefore comparatively expensive to make of wrought-iron. In order that straight pipes may be used for such connections and right-angle joints be made between such pipes and the drum, I have changed the form of the drum, as shown in Figs. 19, 20, 21, and 22. In Fig. 19 the pipe $a^5$ is shown as straight and as projecting from the inner face of the header $a'$. To receive the series of these pipes with right-angle joints, the exterior strap $k'$ is embossed, so as to provide it with a series of pockets $k^3$, the faces $k^4$ of which will stand at right angles to the longitudinal axes of the pipes $a^5$, the said faces being perforated to receive the pipes, as shown in Fig. 21. The portions $k^5$ of the strap, between the pockets $k^3$ of the strap and between the pockets $k^3$, are left on the same curve as the drum, so as closely to hug and reinforce the same, and the pockets communicate with the drum through perforations $a^6$.

In Figs. 20 and 21 the pipes $a^5$ are straight, but project from the tops of the headers $a'$. The strap $k'$ is embossed to form the pockets $k^3$, the faces $k^6$ of which stand at right angles to the longitudinal axes of and are perforated to receive the pipes $a^5$, the portions $k^5$ of the strap hugging the drum, as just described.

A boiler supplied with a feed-water heater is shown in Fig. 11. The two parts of the heater are denoted by L L', and each consists of a series of pipes $l$, the ends of which are joined together, as by boxes $l'$, in a common manner, as shown in Fig. 12. The part L is provided with an inlet M, having a valve $m$, and the part L' with an inlet M', having a valve $m'$, the said inlets being supplied by a pipe N. The part L has an outlet O, furnished with a valve $o$, and the part L' has an outlet O', provided with a valve $o'$, such outlets discharging through a pipe P. When running normally, all these valves are open, so that water passes through both halves of the heater; but should a leak or other damage occur in either part of the heater the valves of such part can be closed, leaving the other part to supply the heated water until repairs have been made. The expense of such a double heater is but slightly in excess of a single one, and its utility is evident under the circumstances mentioned. This feed-water heater is not claimed in this application, as it is intended to make it the subject-matter of a separate application.

What I claim as my invention, and desire to secure by Letters Patent, is—

1. In a sectional steam-generator of the type described, a transverse water-box connected to upright columns which support said box and to the front headers and drum by short tubes or nipples, whereby the boiler is suspended at the front to said box and columns, substantially as specified.

2. In a sectional steam-generator, a transverse water-box located at the front of the boiler and connected to the drum and to the front headers; a transverse water-box connected to the drum and to the rear headers of the boiler, and to front and rear upright columns respectively, by means of short tubes or nipples which support said boxes and thereby suspend the whole boiler, substantially as set forth.

3. A sectional steam-generator comprising front and rear upright water-columns, a series of water-tubes on each side of the boiler connected at their ends to said columns, and a transverse water-box at the front of the boiler, nippled to the drum and to the front water-columns, and having the front headers of the boiler nippled thereto, substantially as specified.

4. A sectional steam-generator of the type described, constructed with front and rear upright water-columns; a series of water-tubes on each side of the boiler having their ends connected to a front and a rear column respectively; a transverse water-box connected to the drum, and to the front water-columns and having the front headers of the boiler connected thereto; and a transverse water-box connected to the drum and to the rear water-columns and having the rear headers of the boiler connected thereto, substantially as specified.

5. A sectional steam-generator having front and rear upright water-columns which are connected with the drum; a series of water-tubes on each side of the boiler connected at their ends to said columns, the lower tubes of the series having flat inner faces which form the sides of the furnace; and a transverse water-box connected to the drum, and to the front water-columns and to the front headers of the boiler, substantially as set forth.

6. In a sectional steam-generator, a series of water-tubes located on each side of the boiler and connected at their front and rear ends to upright water-columns, which are connected to the drum, the lower tubes of said series being inclined upwardly from rear to front, having flat inner faces and forming the side walls of the furnace, substantially as set forth.

7. A sectional steam-generator having a series of water-tubes located on each side of the boiler and connected at their front and rear ends to upright water-columns, which are connected to the drum, the lower tubes of said series being inclined upwardly, having flat inner faces and forming the side walls of the furnace, substantially as set forth.

8. A sectional steam-generator constructed with front and rear upright water-columns which are connected with the drum; a series of water-tubes on each side of the boiler connected at their ends to said columns; and a transverse water-box located below the furnace-doorway; connected at its ends to the front water-columns; and an arch-shape water-conduit extending along the sides and over the top of said doorway, and connected to said box and to a front header of the boiler, substantially as set forth.

9. In a steam-boiler having a series of water-tubes extending along each side of the boiler, outlying the main tubes thereof and connected with the steam-and-water drum, the combination of a siding composed of an outer metal sheet, an inner sheet, and an intermediate filling of non-heat-conducting material; and blocks or filling-pieces of such material located within the siding and between said side tubes, substantially as and for the purposes specified.

10. The combination, with a steam-boiler, of a siding composed of an outer metal sheet, an inner sheet of non-heat-conducting material made up of sectional parts, and an intermediate filling of non-heat-conducting material made up of blocks which break joints with those of the inner sheet-sections, substantially as set forth.

11. The combination, with steam-boiler, of a siding composed of an outer metal sheet, an inner sheet of non-heat-conducting material made up of sectional parts; an inner serpentine lining made up of sectional parts secured to the inner sheet; and a filling of non-heat-conducting material between the outer and inner sheets, substantially as set forth.

12. In a steam-boiler having a series of water-tubes extending along each side of the boiler, outlying the main tubes thereof and connected with the steam-and-water drums, the combination of a siding composed of an outer metal sheet, an inner sheet of non-heat-conducting material; an intermediate filling of non-heat-conducting material, an inner lining of serpentine form projecting inward between said side tubes, and a packing of non-heat-conducting material located in the spaces between the inner sheets and the inner lining, substantially as set forth.

13. In a sectional steam-generator, a series of water-tubes on each side of the boiler connected at each end with the drum; a transverse water-box located below the furnace-doorway, connected at its ends with said side tubes, and to a front header of the boiler by water-conduits extending up the sides of said doorway; and a filling of non-heat-conducting material located between said box and the front headers of the boiler, substantially as set forth.

NAT W. PRATT.

Witnesses:
CHAS. W. FORBES,
J. G. WARD.